UNITED STATES PATENT OFFICE.

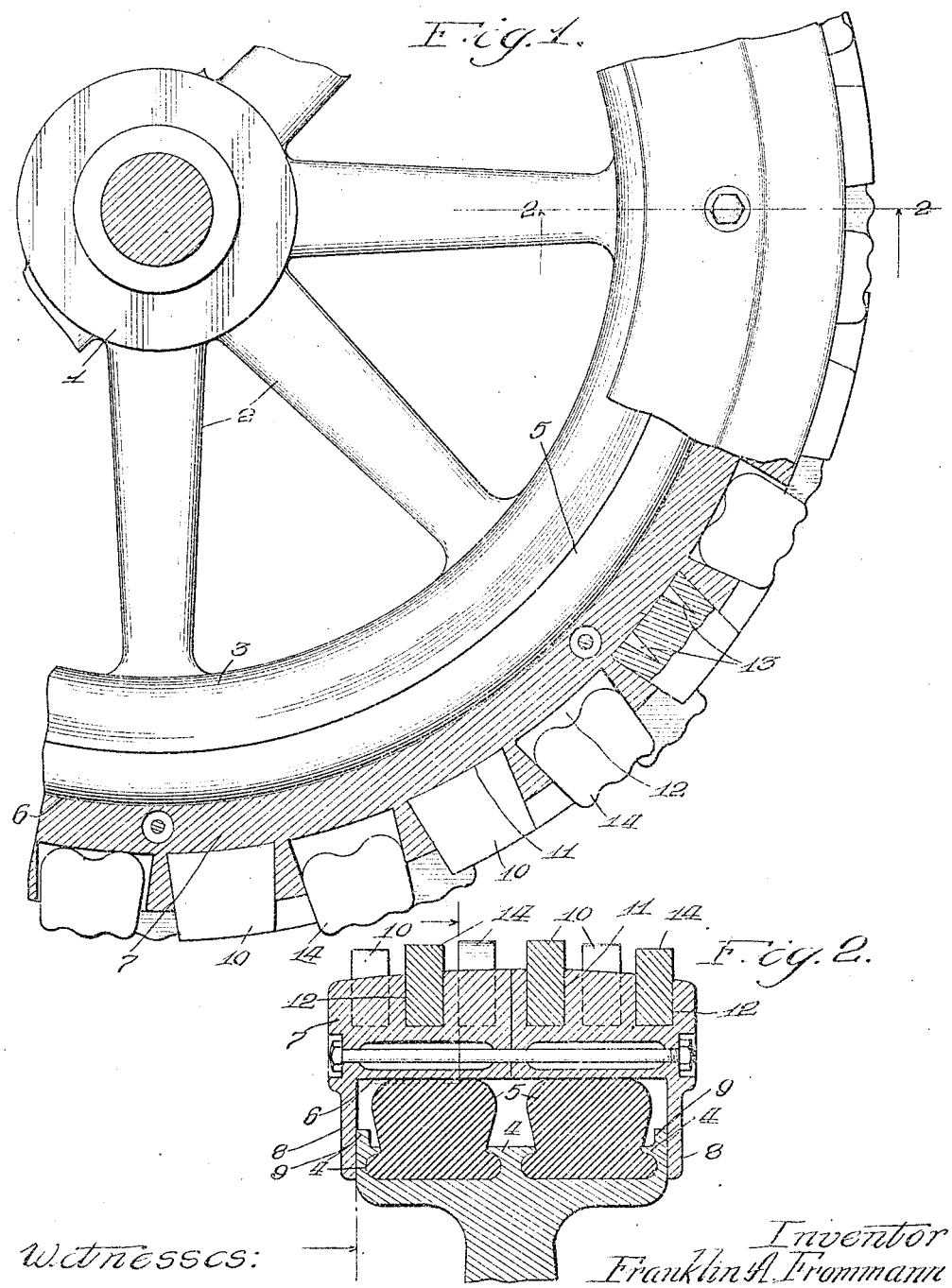

FRANKLIN A. FROMMANN, OF CHICAGO, ILLINOIS.

WHEEL-RIM.

1,292,300.   Specification of Letters Patent.   Patented Jan. 21, 1919.

Application filed April 21, 1913, Serial No. 762,576. Renewed July 8, 1918. Serial No. 243,942.

*To all whom it may concern:*

Be it known that I, FRANKLIN A. FROMMANN, a citizen of the United States, residing at Chicago, in the county of Cook and State of Illinois, have invented certain new and useful Improvements in Wheel-Rims; and I do hereby declare the following to be a full, clear, and exact description of the invention, such as will enable others skilled in the art to which it appertains to make and use the same.

My invention relates to rims or tire formations for vehicle wheels and more particularly to the class of rims used on wheels having cushioning elements interposed between the hub and spoke member of the wheel and the rim, whereby the rim of the wheel is resiliently and floatingly mounted with respect to the hub of the wheel.

The prime object of my invention is to provide a rim equipped with tread formations, a portion of which are rigidly mounted upon the rim and adapted to receive the radial and circumferential strains while the wheel is in service; another portion of which tread formations are yieldingly mounted radially of the wheel, but adapted to resist lateral strains so as to prevent skidding.

While the rim of my invention is applicable to wheels of widely different construction, it is particularly adapted for use with internally cushioned wheels and is shown in this application in the accompanying drawings, in which—

Figure —1— is a fragmentary side view of a wheel equipped with the rim of my invention.

Fig. —2— is a fragmentary radial section of the wheel of Fig. 1, along the line 2—2.

In the embodiment shown in drawings, the wheel comprises a hub 1 having spokes 2 integral therewith, the outer end of the spokes being joined to an inner rim 3 equipped with grooved formations 4, which formations clenchingly secure a pair of annular cushioning members 5 to the said inner rim. These cushioning rings are preferably of vulcanized rubber and have their peripheries bearing against the inner cylindrical surface 6 of an outer rim 7. The latter is equipped with side flanges 8 having sliding engagement with the radially outwardly extending flanges 9 of the inner rim 3, whereby the outer rim 7 is permitted to move radially and circumferentially with respect to the inner rim 3 carried by the hub member of the wheel.

In the drawings, the outer rim 7 is shown as made of cast iron or steel and as equipped upon its periphery with a plurality of pockets extending radially inwardly from the periphery of the rim and arranged in a series of annular formations. Each pocket preferably is uniform in width laterally of the wheel, but shorter at its radially outer end or mouth (circumferentially of the wheel) than at its inner or closed end. In making the wheel, each alternate pocket 11 is formed by suitably positioning a tapering core of sand in the mold; while in the places for the pockets 12 alternating therewith, wedge-shaped steel tread-blocks 14 coated with a film of sand are positioned. After the wheel has been cast, the sand is shaken out, leaving a plurality of tapering pockets with a steel tread-block loosely mounted in each alternate pocket. Into each of the empty pockets a wooden tread-block 10 is then inserted and is locked in place by the spreading action of steel wedges 13 which project from the inner end of the block when the latter is inserted in the pocket and which are forced into the wood when the block is driven radially inward.

The wood blocks are preferably of the same height as the steel blocks 14, so that the alternate steel and wood blocks present a tread portion of uniform diameter when the slidably mounted steel blocks are in their radially inward positions. It will be evident from Fig. 1 that the steel tread blocks will slide outwardly of the wheel when approaching the roadway and that on a level roadway they will be pressed inwardly into substantially circumferential alinement with adjacent wooden tread blocks. However, if the wheel is passing over mud holes or other uneven spots, the slidable blocks may project beyond the circumference of the adjacent wooden blocks. Consequently, the wheel will exert a greater traction upon the roadway than it would if the tread blocks were all rigidly mounted and the projecting steel blocks will tend to catch in irregularities of the roadway so as to prevent a lateral sliding or skidding of the wheel.

To insure a proper distribution of the non-skidding action of the slidable steel blocks and of the somewhat resilient action of the wood tread blocks, I preferably alternate the same not only in their annular formations but also arrange the blocks comprising adjacent annular formations in staggered relation to each other. To increase the tractive effort of the blocks having a limited radial motion with respect to the rim pockets in which they are housed, I preferably provide the outer surface of these blocks with corrugations extending parallel to the shaft of the wheel. However, I do not wish to be limited to this or other details of the construction herein disclosed since the latter might be modified in many respects without departing from the spirit of my invention.

I claim as my invention:—

1. In a vehicle wheel, a rim member having a plurality of peripherally disposed pocket formations opening radially outward and contracted at their openings, and a tread block housed in each of said pockets; each of the said tread blocks being smaller at its inner end than the bottom of the pocket and larger at its inner end than the opening of the said pocket, the said relative size of each block and pocket coöperating to permit a limited radial motion of the block with respect to the rim; and a plurality of rigidly mounted tread blocks alternating upon the rim with the said movably mounted tread blocks.

2. In a rim for vehicles, a rim member having a plurality of pockets upon its periphery, and tread blocks positioned in the said pockets; some of the said blocks rigidly secured to the rim member, others of the said blocks having restricted radial motion with respect to the rim member.

3. In a rim for vehicles, a rim member having a plurality of tread blocks disposed in annular formations upon the same, each of said annular formations comprising a series of rigidly mounted tread blocks alternating with tread blocks mounted in rim pockets permitting limited radial motion to the tread blocks mounted therein.

4. In a rim for vehicles, a rim member having a plurality of tread blocks disposed in annular formations upon the same, each of said annular formations comprising a series of rigidly mounted tread blocks alternating with tread blocks mounted in rim pockets permitting limited radial motion to the tread blocks mounted therein; the rigidly mounted tread blocks being of a more resilient material than the movably mounted tread blocks.

In testimony whereof I have signed my name in presence of two subscribing witnesses.

FRANKLIN A. FROMMANN.

Witnesses:
ALBERT SCHEIBLE,
M. M. BOYLE.

Copies of this patent may be obtained for five cents each, by addressing the "Commissioner of Patents, Washington, D. C."